Figure 1:
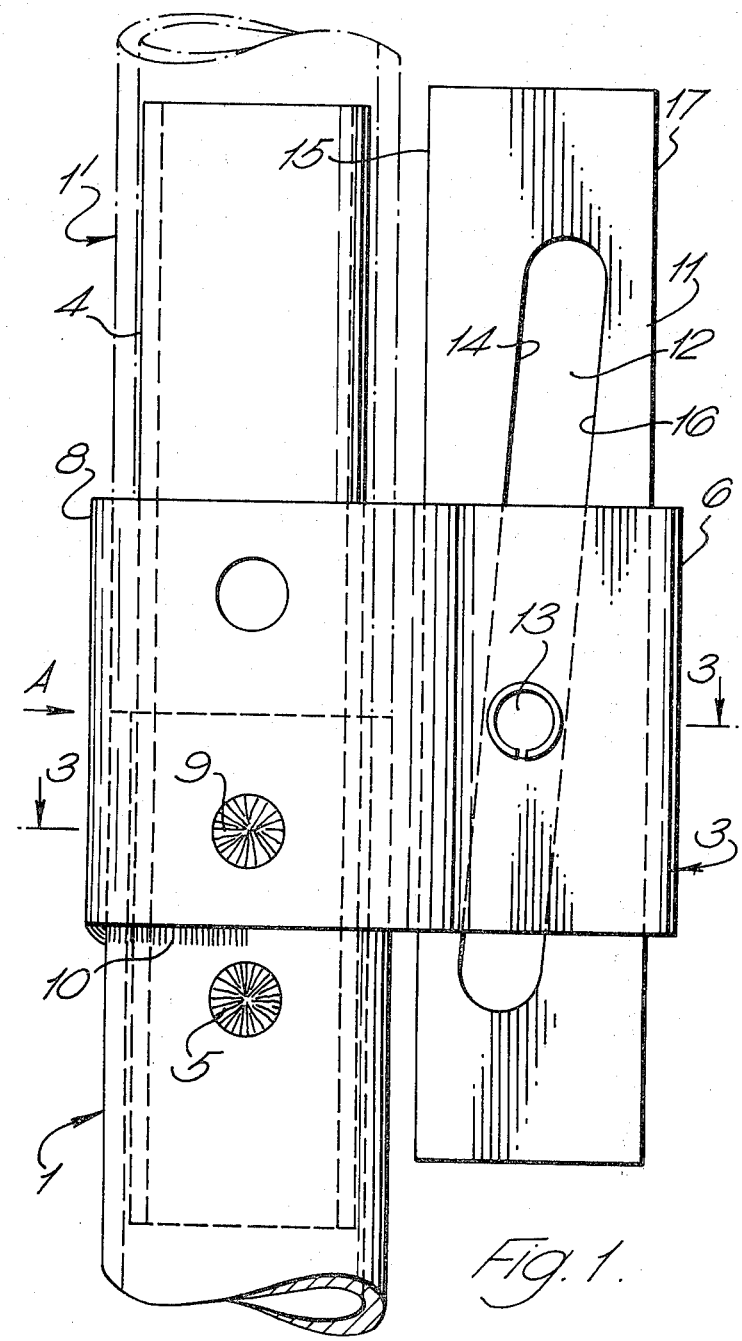

United States Patent [19]
Gostling

[11] 3,926,531
[45] Dec. 16, 1975

[54] BUILDERS SCAFFOLDING
[75] Inventor: Peter Eric Gostling, Sutton Coldfield, England
[73] Assignee: C. Evans & Sons Limited, Gants Hill, England
[22] Filed: Aug. 8, 1974
[21] Appl. No.: 495,889

[30] Foreign Application Priority Data
   Aug. 13, 1973    United Kingdom............... 38211/73

[52] U.S. Cl. ................ 403/293; 182/178; 403/341; 403/374
[51] Int. Cl.² .......................................... F16B 7/04
[58] Field of Search ........... 403/341, 293, 374, 187, 403/195, 256, 254, 252; 182/178, 179; 52/637, 638

[56] References Cited
UNITED STATES PATENTS
2,696,649   12/1954   Clapper ............................. 403/374
3,707,304   12/1972   Gostling.............................. 182/178

FOREIGN PATENTS OR APPLICATIONS
1,163,532   9/1969   United Kingdom................. 403/374

Primary Examiner—Reinaldo P. Machado
Attorney, Agent, or Firm—Melville, Strasser Foster & Hoffman

[57] ABSTRACT

A standard for builders scaffolding having a head fitting for use in coupling two standards together in end-to-end relationship, said head fitting comprising a male adapter element, and a bracket member which is formed at its ends to engage and be fixed to the standard, said bracket also being formed with a projecting slot in which is received a wedge element which, in use, engages and retains in position the adjacent end of said two standards.

5 Claims, 4 Drawing Figures

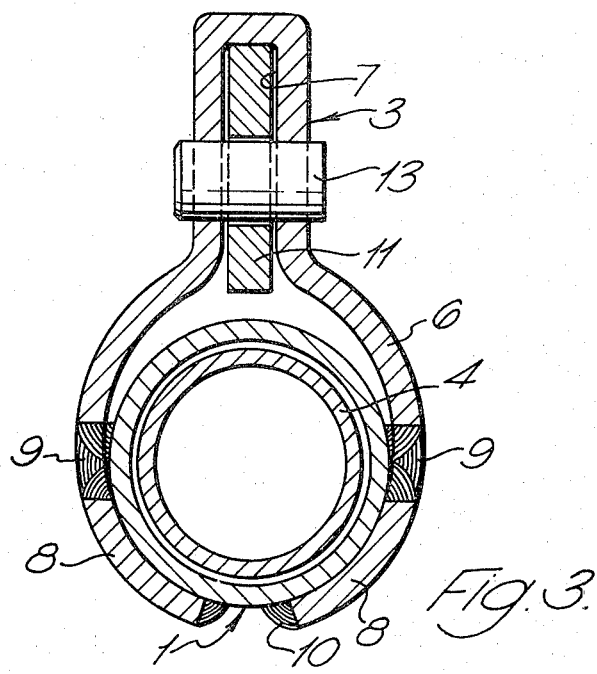
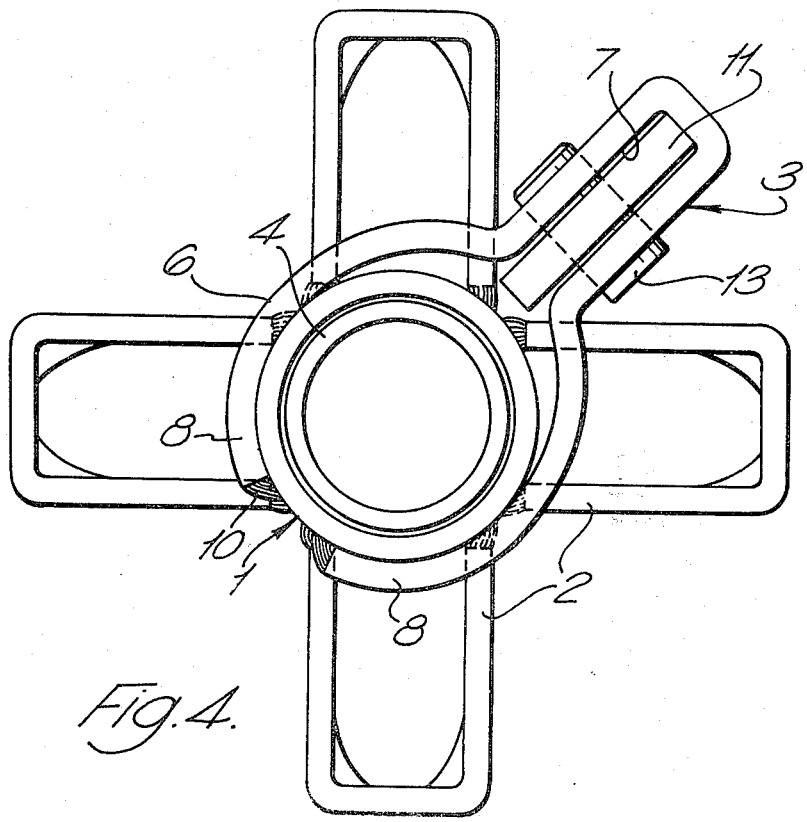

BUILDERS SCAFFOLDING

This invention relates to builders scaffolding of the kind comprising upright supports or standards, longitudinally extending bearers or ledgers and transversely extending bearers or transoms all of which are connected together to form a rigid structure.

The present invention is concerned with an improved standard for such scaffolding, and particularly to a head fitting therefor to enable two or more standards to be joined together in an end-to-end relationship.

Numerous methods for joining two standards together are known in the art but all of these include separate fittings, such as couplings or pins, or have screw fittings which must be tightened down, or they have a telescopic connection which is sometimes loose-fitting and does not therefore provide a rigid connection.

It is among the objects of the present invention to provide a standard having a head fitting which is simple and robust in construction, and one which requires a minimum amount of effort on the part of the erector to assemble and dismantle.

According to the present invention, there is provided a standard for builders scaffolding which comprises a length of tube having a head fitting at one end thereof, the other end thereof being open to present a female fitting, wherein the head fitting comprises a male adapter element projecting co-axially from said one end of the tube to be received in the open end of another standard, a bracket member formed with an open slot and secured to the tube in overlapping relationship with said one end of the tube, and a wedge element received within the open slot so that, in use, one edge thereof is engageable with the outer peripheries of the tubes of two adjacent standards being joined together.

According to a further feature of the invention, the wedge element is captive in the open slot and is arranged so that it can be retained in an inoperative position within the slot.

Figure 2:
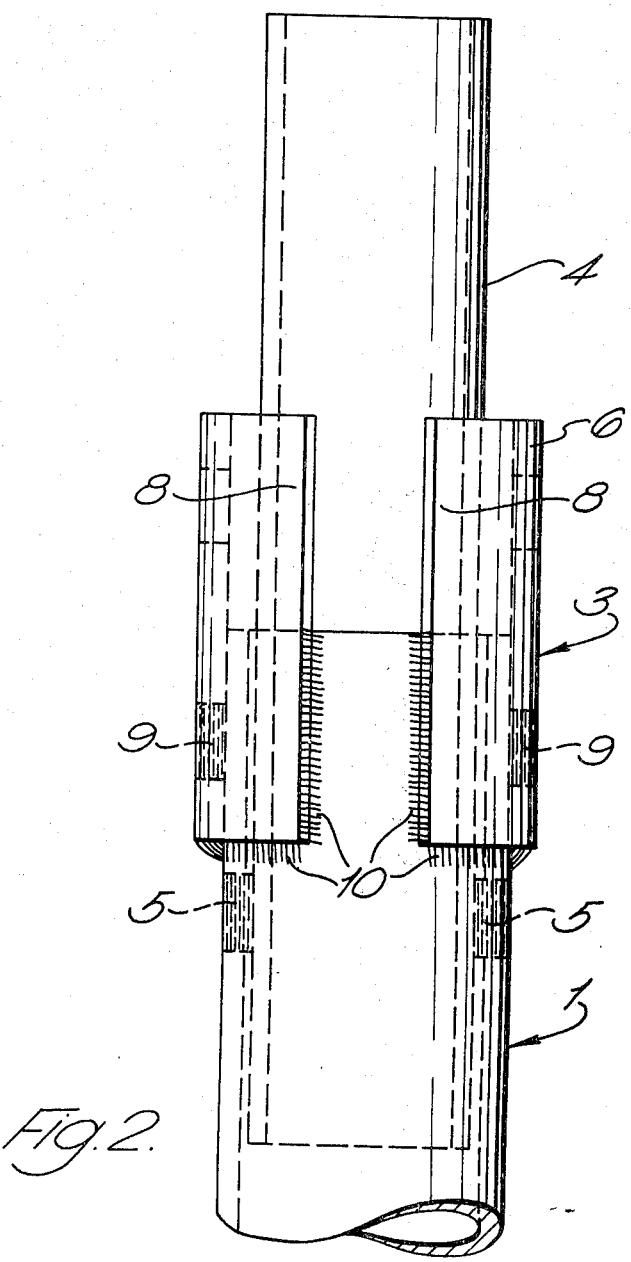

The invention is illustrated by way of example in the accompanying drawing in which, FIG. 1 is a front elevation of the head fitting of a standard according to the invention, with the wedge element in its inoperative position, FIG. 2 is a view in the direction of the arrow A of FIG. 1, FIG. 3 is a section on the line 3—3 of FIG. 1, and FIG. 4 is a plan view.

Referring to the drawings, a standard comprises a length of tube which may have radially extending channel members 2 to receive and support ledgers and/or transoms in known manner.

The tube 1 is provided at one end, which is generally uppermost in use, with a head fitting assembly 3, the other end (not shown) being open to present a female fitting.

Fitted into, and projecting from, the said one end of the tube 1 is a male element 4 which corresponds in outer diameter to the inner diameter of the tube 1. The element 4, which is fixed to the tube, may be in the form of a solid spigot or it may be in the form of a tube and serves, in use, to be received in the lowermost and open end of a second standard 1' as is indicated in FIG. 1.

A bracket member 6 is secured, as by welding or any other suitable means, to the end of the tube 1 so that it overlaps the junction between the tube 1 and the male element 4 as is clearly shown in the drawings. The bracket 6 consists of a strip of metal which is bent to present a narrow open slot 7, the opening being towards the tube 1, and a pair of arcuate arms 8 which closely fit, and wrap around, the tube 1. Preferably, the arms 8 are fixed to the tube 1 by plug welds 9 and seam welds 10.

A wedge element 2 is received within the slot 7 and is formed to enter, when in use, into tight engagement with the outer peripheral surfaces of the tubes 1 and 1' and thereby provide a rigid connection therebetween.

As can be seen from the drawings, the wedge element 11 may be in the form of a rectangular plate having an angled closed slot 12 which co-operates with a transverse pin 13 positioned to extend between the arms forming the slot 7.

In use, it will be seen particularly from FIG. 1 that, as the wedge element 11 is driven home in a downward direction into its operative position, one surface 14 of the slot 12 engages the pin 13 and causes the element to move to the left in FIG. 1 so that the edge 15 thereof is caused to enter into engagement with the tubes 1 and 1'. When dismantling the structure, the wedge 11 is driven in an upward direction so that the surface 16 of the slot 12 engages the pin 13 and causes the element to move to the right in FIG. 1 so that the opposite edge 17 thereof is caused to enter into tight engagement with the base of the slot 7. This action serves to retain the wedge element 11 in an inoperative position so that, when the standard is next used, the erector does not need to manipulate the wedge in any way in order to position a second standard over the male element 4.

The invention is not limited to the particular wedge element described. Thus, the wedge element may be in the form of a cranked plate which co-acts with a projection positioned on one side only of the slot 7; or it may be in the form of a plate having a recess instead of the slot 12 which recess co-acts with a projection on one side of the slot 7; or it may be of any other convenient form provided only that it is captive in the slot 7 and is arranged so that it is temporarily retained in its inoperative position.

As can be seen from FIG. 4, the slotted part of the bracket member 6 is preferably arranged in a plane which is at 45° to the planes of the channel members 2 so as to avoid the possibility of the members 2 interfering with the operation of striking the wedge element 11.

I claim:

1. A standard for builders scaffolding which comprises a length of tube having one plain end and a head fitting fixedly secured to the other end thereof, said head fitting being adapted to receive the plain end of a second length of tube to join said tube and said second tube together in end-to-end relationship with one another, and wherein said head fitting comprises a male adaptor element fixed in and projecting coaxially from said other end of said tube to be received in said plain end of said second tube, a bracket member secured to said tube in overlapping relationship with said other end of said tube, said bracket member being formed with a narrow open slot extending radially outwards from said tube, and a wedge element positioned, and held captive, in said open slot so that, in use, said wedge element is movable between an inoperative position where one side edge thereof is spaced from the outer peripheries of said tube and said second tube being joined, and an operative position where said one side edge thereof is in direct engagement with said outer peripheries of said tube and said second tube.

2. A standard as claimed in claim 1, in which said bracket member comprises a strip of metal which is bent to present said narrow open slot and a pair of arcuate arms which closely fit, and wrap round, said tube.

3. A standard as claimed in claim 2, in which said wedge element comprises a flat rectangular plate having an angled closed-ended slot, said slot having received therein a pin extending transversely through said open slot.

4. A standard as claimed in claim 3, in which the position of said pin is such that, in the operative position, one side edge of said wedge element is urged into engagement with the outer peripheries of two of said standards being joined, and in the inoperative position, the opposite side edge of said wedge element is urged into engagement with said bracket member.

5. A standard as claimed in claim 4, in which radially extending channel members are fixed to said standard to receive ledgers or transoms, and wherein the plane of said open slot of said bracket lies at an angle to the plane of said channel members.

* * * * *